US012662248B2

(12) United States Patent
Pillarisetty

(10) Patent No.: US 12,662,248 B2
(45) Date of Patent: Jun. 23, 2026

(54) BACK SUPPORT ON SEAT

(71) Applicant: B/E Aerospace, Inc., Winston-Salem, NC (US)

(72) Inventor: Krishnateja Pillarisetty, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 109 days.

(21) Appl. No.: 18/779,593

(22) Filed: Jul. 22, 2024

(65) Prior Publication Data

US 2025/0282479 A1    Sep. 11, 2025

(30) Foreign Application Priority Data

Mar. 6, 2024    (IN) .............................. 202411015823

(51) Int. Cl.
B64D 11/06 (2006.01)
(52) U.S. Cl.
CPC ................................ B64D 11/0639 (2014.12)
(58) Field of Classification Search
CPC ..... B64D 11/0639; A47C 7/462; A47C 7/465; B60N 2/66; B60N 2/6671
USPC ...................................... 297/284.8
See application file for complete search history.

(56) References Cited

U.S. PATENT DOCUMENTS

| | | | |
|---|---|---|---|
| 5,022,709 A | 6/1991 | Marchino | |
| 5,452,868 A * | 9/1995 | Kanigowski | B60N 2/6671 |
| | | | 297/284.4 |
| 5,911,477 A | 6/1999 | Mundell et al. | |
| 2004/0108760 A1* | 6/2004 | McMillen | B60N 2/6671 |
| | | | 297/284.4 |
| 2007/0057548 A1 | 3/2007 | Buffa | |
| 2008/0217978 A1* | 9/2008 | Stossel | B60N 2/6671 |
| | | | 297/284.4 |
| 2009/0212616 A1* | 8/2009 | McMillen | A47C 7/462 |
| | | | 297/284.4 |
| 2016/0296025 A1* | 10/2016 | Smith | A47C 7/26 |

FOREIGN PATENT DOCUMENTS

| | | |
|---|---|---|
| GB | 2013487 A | 8/1979 |
| KR | 2019960021364 U | 7/1996 |

* cited by examiner

*Primary Examiner* — Alfred J Wujciak
(74) *Attorney, Agent, or Firm* — Suiter Swantz IP

(57) ABSTRACT

A device may include a support strip disposed adjacent to a lower position of a seatback frame of a passenger seat. A device may include a first cable coupled on a first end to a first strip end of the support strip. A device may include a first cable adjustor coupled to a second end of the first cable, wherein an actuation of the first cable causes a movement of the support strip from a back position to a forward position.

13 Claims, 9 Drawing Sheets

900

910 — SITTING ON A PASSENGER SEAT

920 — ROTATING A KNOB INTEGRATED INTO AN ARMREST OF THE PASSENGER SEAT

930 — MOVING A SUPPORT STRIP OF THE PASSENGER SEAT FROM A BACK POSITION TO A FORWARD POSITION

BACK SUPPORT ON SEAT

CROSS-REFERENCE TO RELATED APPLICATION

The present application claims the benefit under 35 U.S.C. § 119(e) of Indian Provisional Application Serial Number 202411015823, filed Mar. 6, 2024, naming Krishnateja Pillarisetty as inventor, which is incorporated herein by reference in the entirety.

BACKGROUND

Aircraft passengers often suffer back pain during flight, particularly during long flights where the passenger needs to sit down for extended periods of time. Therefore, there is a need for a system that supports the back of the passengers as they sit in the passenger seat.

SUMMARY

In some aspects, the techniques described herein relate to a system including: a support strip disposed adjacent to a lower position of a seatback frame of a passenger seat; a first cable coupled on a first end to a first strip end of the support strip; a first cable adjustor coupled to a second end of the first cable, wherein an actuation of the first cable causes a movement of the support strip from a back position to a forward position.

In some aspects, the techniques described herein relate to a system, wherein the first cable includes a Bowden cable, the Bowden cable including: an inner cable coupled to the cable adjustor and the first end of the support strip; and an outer cable.

In some aspects, the techniques described herein relate to a system, wherein the first cable adjustor includes a first knob, wherein the first knob includes an axle coupled to the inner cable, wherein a rotation of the first knob causes the inner cable to wind onto the axle and causes a movement of the support strip from a back position to a forward position.

In some aspects, the techniques described herein relate to a system, wherein the first cable adjustor is integrated into a first armrest of the passenger seat.

In some aspects, the techniques described herein relate to a system, wherein the first cable adjustor is integrated into a first armrest of the passenger seat.

In some aspects, the techniques described herein relate to a system, further including the first armrest and the seatback In some aspects, the techniques described herein relate to a system, wherein the first cable adjustor includes at least one of a lever or pull handle.

In some aspects, the techniques described herein relate to a system, further including the passenger seat.

In some aspects, the techniques described herein relate to a system, further including: a second cable including a first end, the first end of the second cable coupled to a second end of the support strip; a second cable adjustor coupled to a second end of the second cable, wherein an actuation of the second cable causes a movement of the support strip from a back position to a forward position.

In some aspects, the techniques described herein relate to a system, wherein the first cable includes a first Bowden cable, the first Bowden cable including: an inner cable coupled to the first cable adjustor and the first end of the support strip; and an outer cable, wherein the second cable includes a second Bowden cable, the second Bowden cable including: an inner cable coupled to the second cable adjustor and the second end of the support strip; and an outer cable.

In some aspects, the techniques described herein relate to a passenger seat including a seat pan; a seat back frame; a first armrest; a support strip disposed adjacent to a lower position of a seatback frame of the passenger seat; a first cable coupled on a first end to the support strip; a first cable adjustor integrated into the first armrest and coupled to a second end of the first cable, wherein an actuation of the cable causes a movement of the support strip from a back position to a forward position.

In some aspects, the techniques described herein relate to a passenger seat, further including: a second cable including a first end, the first end of the second cable coupled on a first end to a second end of the support strip; a second cable adjustor coupled to a second end of the second cable, wherein an actuation of the second cable causes a movement of the support strip from a back position to a forward position.

In some aspects, the techniques described herein relate to a passenger seat, wherein the first cable includes a first Bowden cable, the first Bowden cable including: an inner cable coupled to the first cable adjustor and the first end of the support strip; and an outer cable, wherein the second cable includes a second Bowden cable, the second Bowden cable including: an inner cable coupled to the second cable adjustor and the second end of the support strip; and an outer cable.

In some aspects, the techniques described herein relate to a passenger seat, wherein the first cable adjustor includes a first knob, wherein the knob includes an axle coupled to the inner cable, wherein a rotation of the first knob causes the inner cable to wind onto the axle and causes a movement of the support strip from a back position to a forward position, wherein the second cable adjustor includes a second knob, wherein the second knob includes an axle coupled to the inner cable, wherein the rotation of the second knob causes the inner cable to wind onto the axle and causes a movement of the support strip from a back position to a forward position.

In some aspects, the techniques described herein relate to a method including: sitting in a passenger seat; rotating a knob integrated into an armrest of the passenger seat; and moving a support strip of the passenger seat from a back position to a forward position.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 8 further includes in an inset the armrest and a cable and knob of the back support mechanism integrated into the armrest.

DETAILED DESCRIPTION

Figure 1:
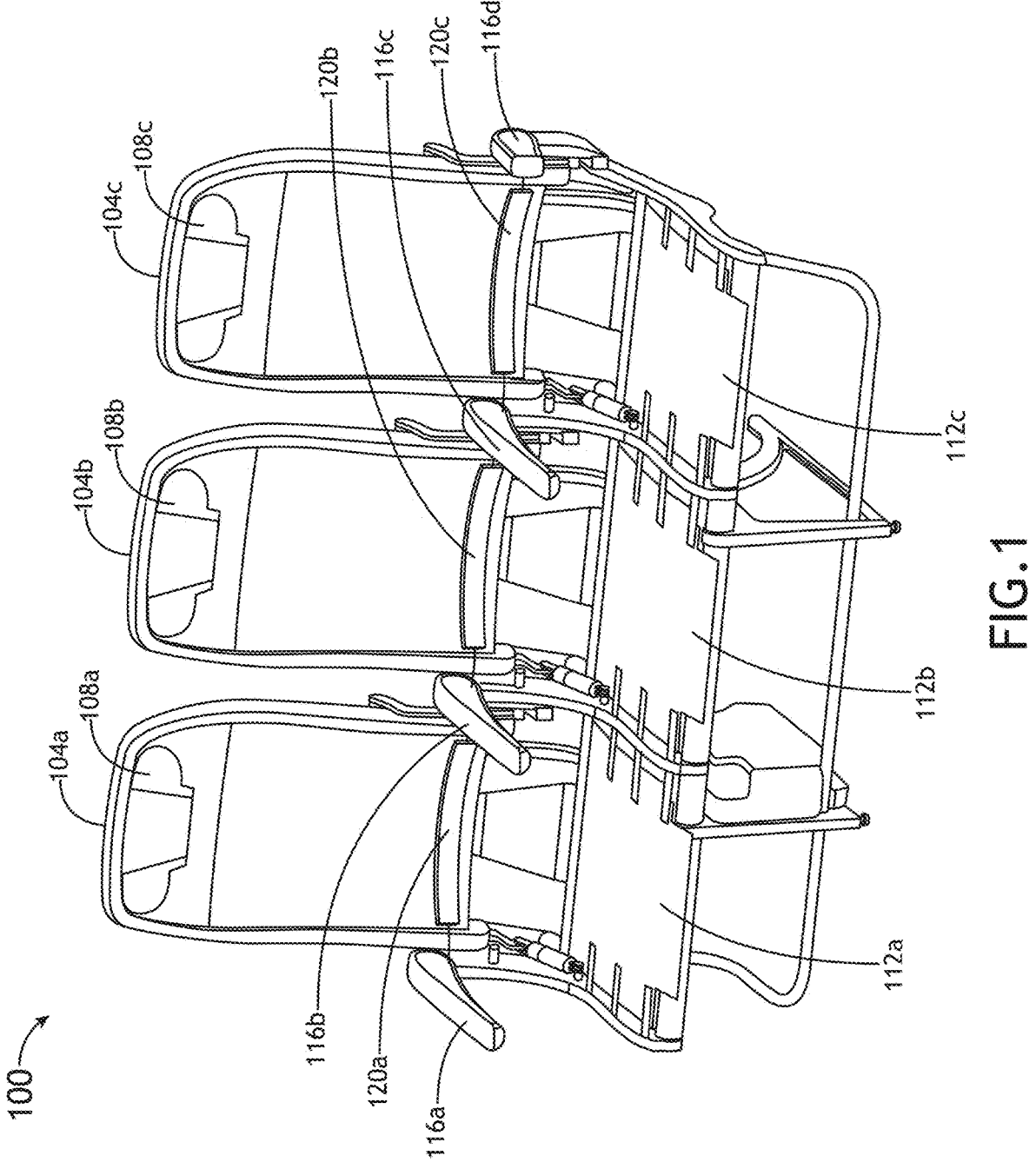
FIG. 1 illustrates a perspective front view of a set of passenger seats.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system, which may include a support strip disposed adjacent to a lower position of a seatback frame of a passenger seat and at least one cable coupled to one or more ends of the support strip. The system may further include one or more cable adjustors (e.g., a knob) integrated into one or more armrests of the passenger seat. When sitting in the passenger seat, a passenger can actuate the adjustor (e.g., turn the knob) to adjust the position (e.g., forward or backward) of the support strip relative to the seatback frame. In this manner, the passenger can adjust the support strip to a comfortable position.

Referring now to FIGS. 1-9, embodiments of the system 100 according to the concepts disclosed herein are depicted. The system 100 may be implemented into any suitable system (e.g., chair, seat, bench) and may be further implemented into any suitable vehicle (e.g., aircraft, bus, automobile). For example, the system 100 may include a passenger seat 104*a-c* or one or more components of the passenger seat 104*a-c*, as shown in FIG. 1. For instance, the system 100 may include a seatback frame 108*a-c*, a seat pan 112*a-c*; and one or more armrests 116*a-d*. The system 100 may further include a support strip 120 that supports the back of a passenger. The support strip 120 may be configured in any supportive structure or shape including but not limited to, a strap.

Figure 2:
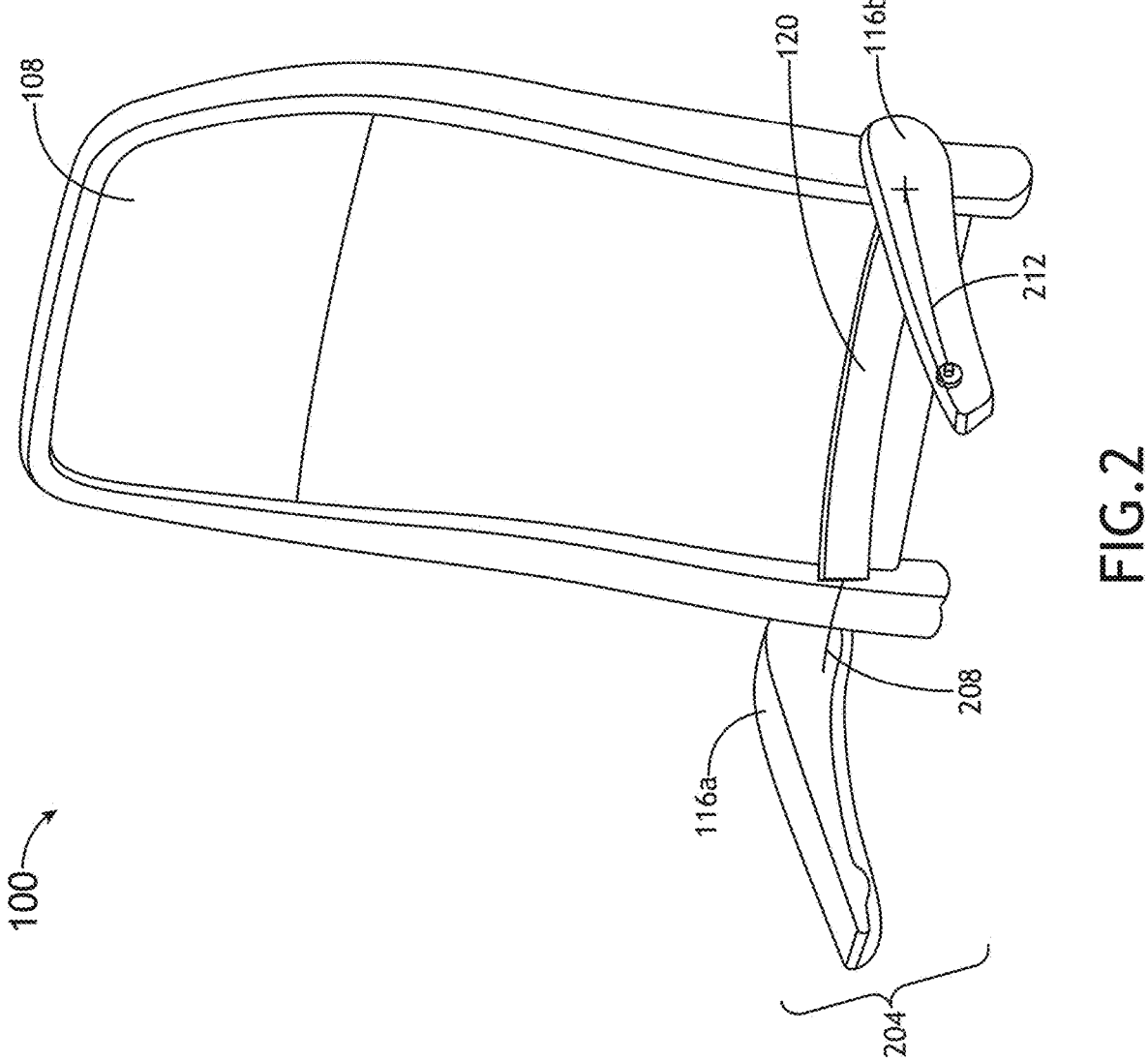
FIG. 2 illustrates a perspective front view of a seatback frame and armrests of a passenger seat.

In a close-up view of the seatback frame 108 and the armrests 116*a-b*, the support strip is shown positioned adjacent to a lower section 204 (e.g., a lumbar section) of the seatback frame 108, as shown in FIG. 2. In embodiments, the system 100 further includes a first cable 208 coupled to the support strip 120. The first cable 208 may be at least partially integrated within a first armrest 116*a*. The system may also include a second cable 212 coupled to the support strip 120. The second cable may be at least partially integrated within a second armrest 116*b*. The system may therefore include a support strip 120 that is coupled at least to a first cable 208, or to a first cable 208 and a second cable 212.

Figure 3:
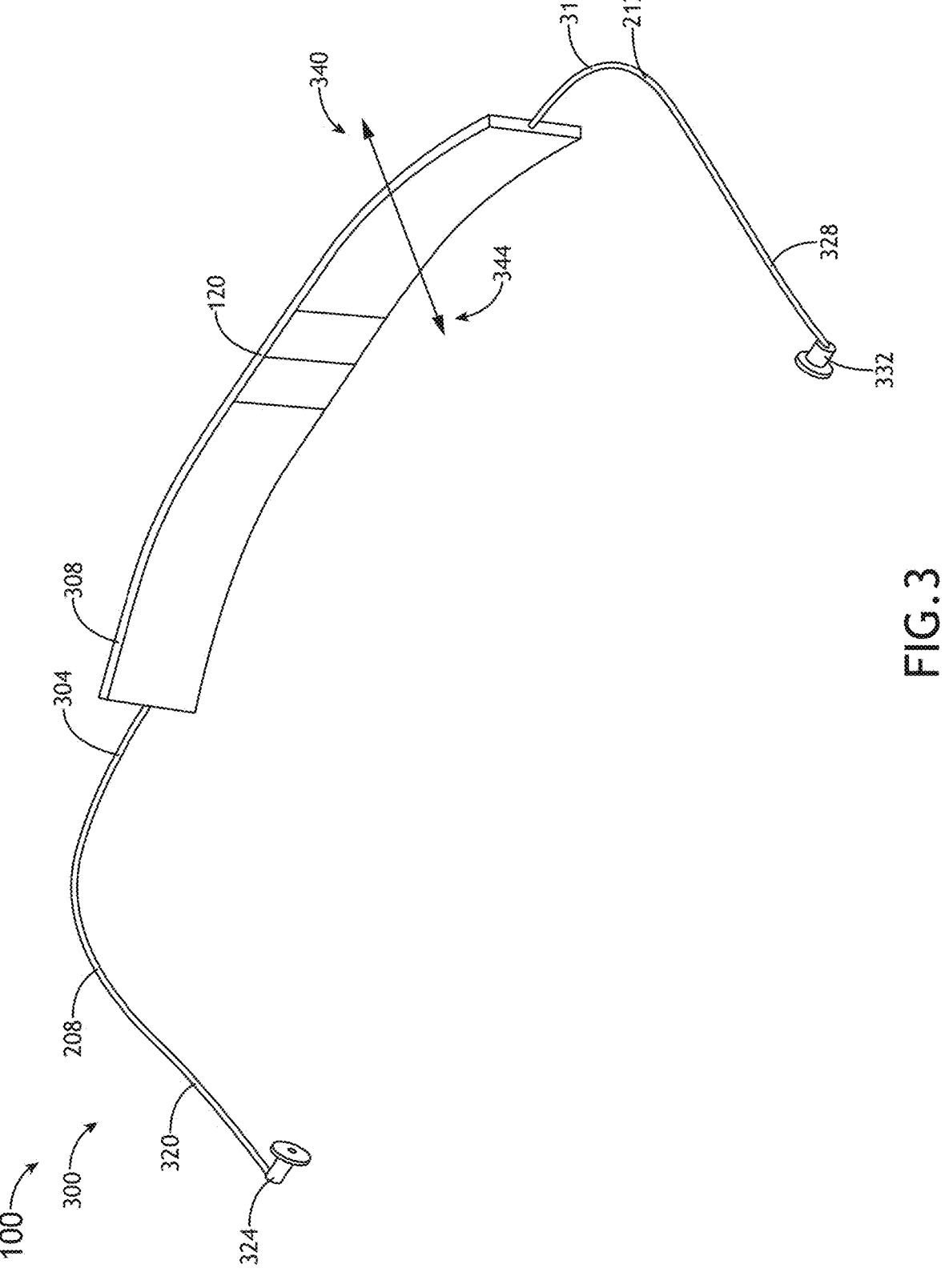
FIG. 3 illustrates a perspective view of a back support mechanism.

A closeup and isolated view of the support strip 120, first cable 208, and second cable (e.g., collectively, a back support mechanism 300) is shown in FIG. 3. The first cable 208 is coupled on a first end 304 to a first strip end of the support strip 120. the second cable 212 is coupled on a first end 312 to a second strip end 316 of the support strip 120. The first cable 208 is coupled on a second end 320 to a first adjustor 324. The second cable 212 is coupled on a second end 328 to a second adjustor 332. The first adjustor 324 and the second adjustor 332 are configured so that when the first adjustor 324 and/or the second adjustor 332 are activated, the support strip 120 moves (e.g., translates) from a back position 340 to a forward position 344 or vice-versa.

Figure 4:
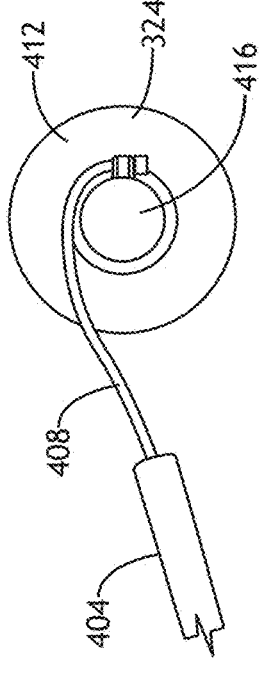
FIG. 4 illustrates a perspective view of a back support mechanism, with cable adjustors shown in detail.
Figure 4:
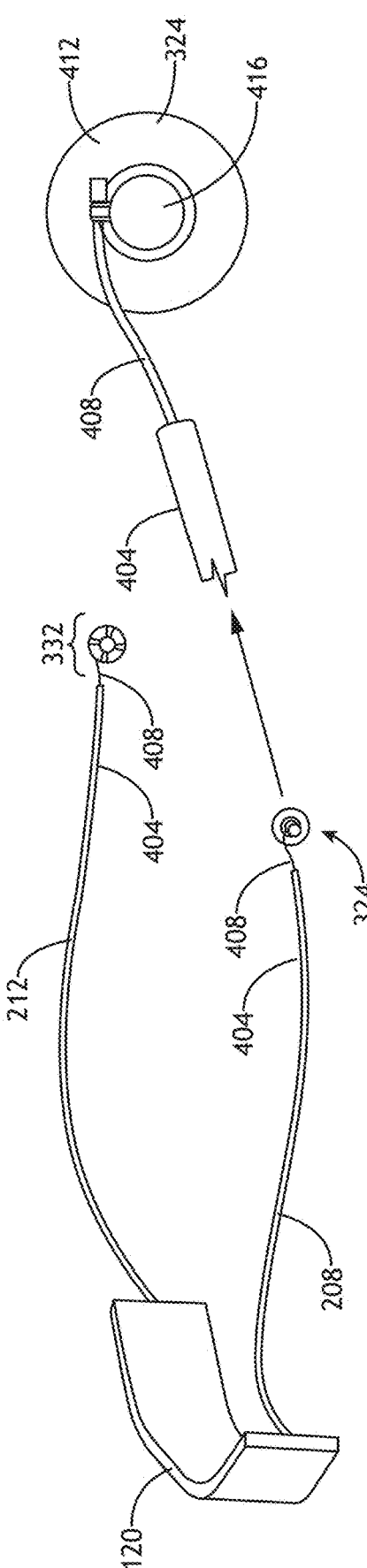

The first cable 208 and/or the second cable 212 may include any type of cable or cable system including but not limited to a Bowden cable. For example, the first cable 208 and/or the second cable 212 may include a Bowden cable comprising an outer cable 404 (e.g., casing) and an inner cable 408, as illustrated in FIG. 4. In use, the first adjustor 324 and/or the second adjustor 332 is coupled directly to the inner cable 408 and can slid the inner cable 408 relative to the outer cable 404. The sliding of the inner cable 408 then causes the movement or translation of the support strip 120 from the back position to the forward position. The first cable 208 and/or the second cable 212 may include other componentry common to Bowden cables including but not limited to a ferrule, a stop sleeve, an adjusting screw, a towing eye, and an anchor (e.g., nipple).

Figure 5:
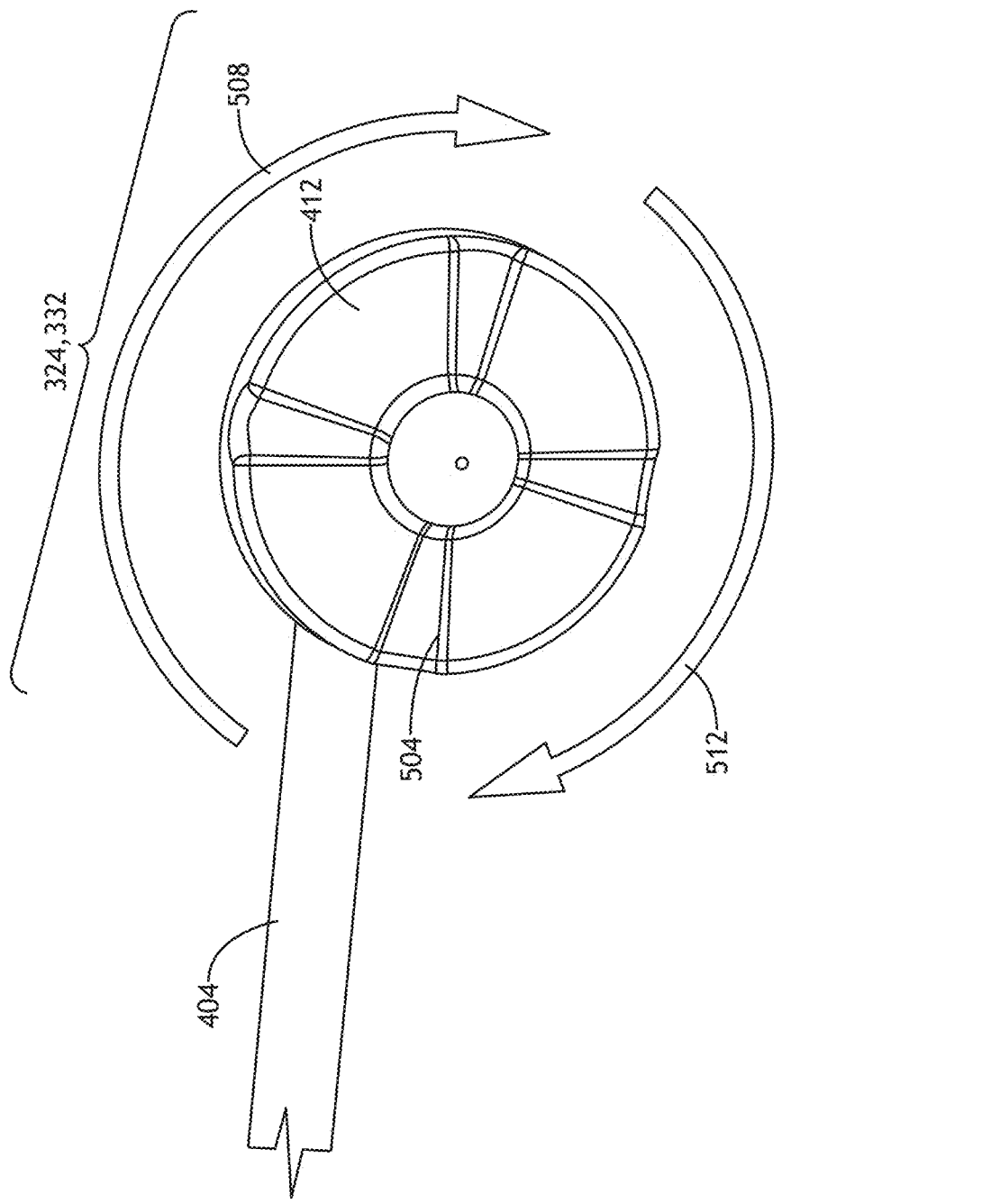
FIG. 5. illustrates a close-up view of a cable adjustor.

The first adjustor 324 and/or the second adjustor 332 may be configured as any type of cable adjusting mechanism, such as cable adjusting mechanisms that can couple to the inner cable 408 and cause the sliding of the inner cable 408 relative to the outer cable 404. Types of cable adjusting mechanisms include but are not limited to lever, pull handles, and twisting mechanisms. For example, the first adjustor 324 and/or the second adjustor 332 may include a knob 412 coupled to the inner cable 408 that can twist or turn so that the inner cable 408 wraps or winds at least partially around an axle. The knob 412 may include one or more protrusions or recesses 504 that aid the passenger in gripping the knob 412 in order to twist the knob clockwise 508 or counterclockwise 512, as illustrated in FIG. 5.

Figure 6:
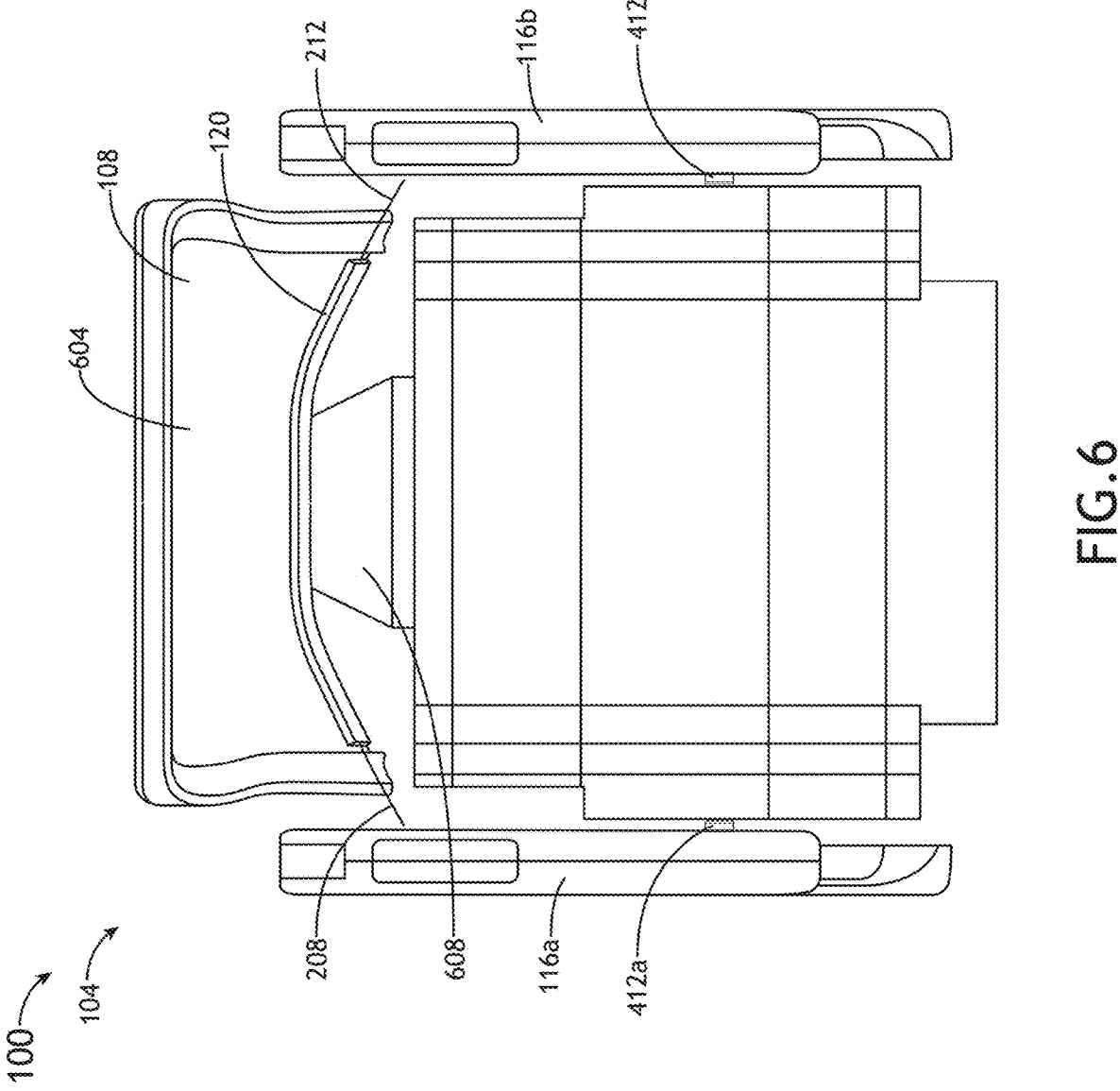
FIG. 6 illustrates a pan view of a passenger seat that includes a back support mechanism.

An example of the positioning of the support strip 120, first cable 208, second cable 212, and the knob 412a-b on the passenger seat 104 are shown in FIG. 6. The support strip support strip 120 is disposed adjacent to a front surface 604 of the seatback frame 108. The seatback frame 108 is shown coupled to the seat pan 112 via a linker 608. The first cable 208 and/or the second cable 212 may feed into, or be integrated into, their respective armrest 116a-b. The knobs 412 are positioned along the armrest. For example, the knobs 412a-b may be positioned at a point along the armrests 116a-b near where the fingers of the passenger are predicted to be placed. The support strip 120 may be designed to follow the contour of the seatback frame 108 or the back of a passenger.

Figure 7:
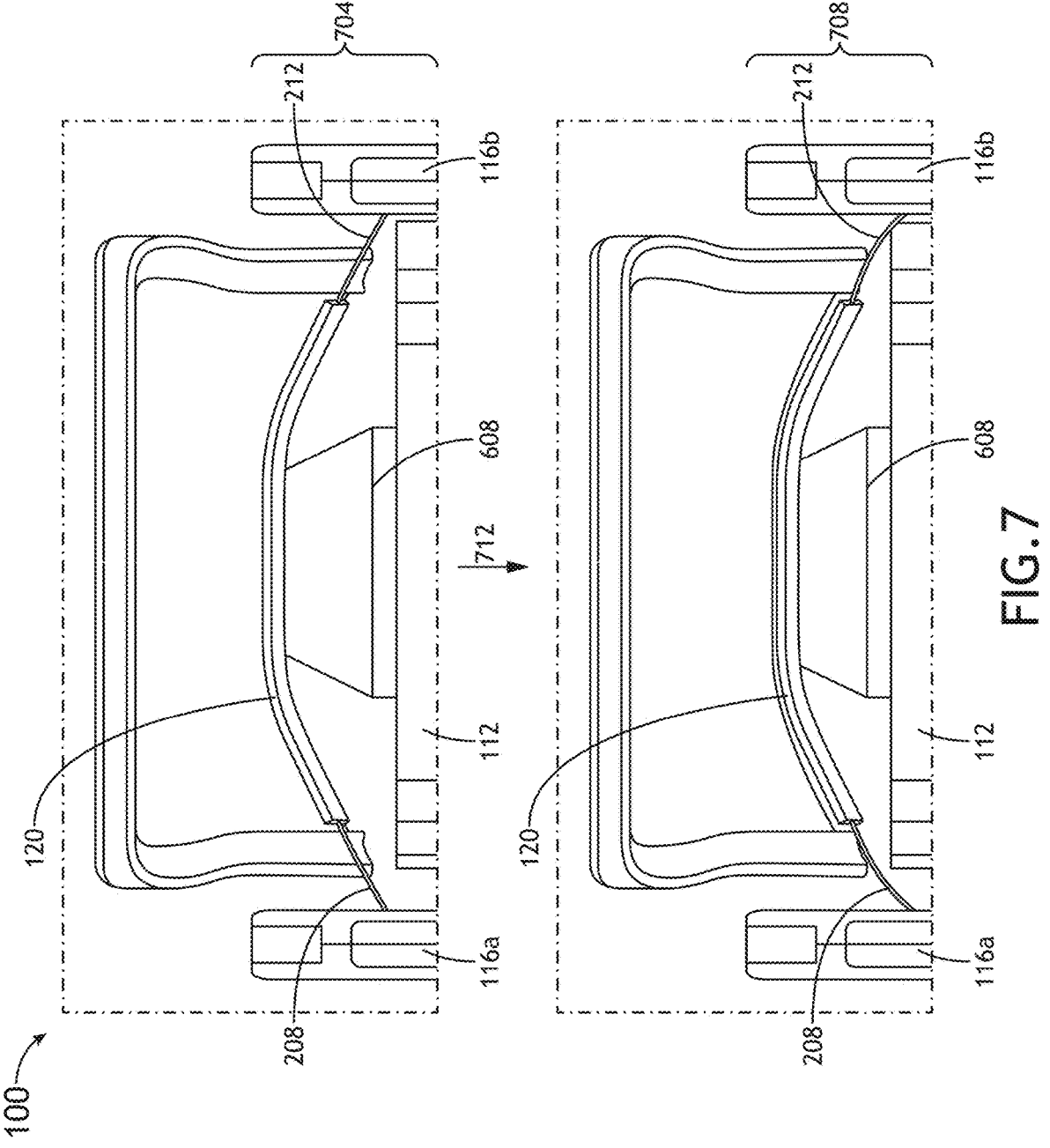
FIG. 7 illustrates closeup pan views of a passenger seat with a support strip configured in a back position and a forward position.

The movement of the support strip 120 from a back position 704 to a forward position 708 is illustrated in FIG. 7. In the back position 704, the support strip 120 is positioned close to the front surface 604 of the seatback frame 108. Upon movement 712 (e.g., translation) to the forward position 708, the support strip 120 is moved to a position forward (e.g., aft) relative to the front surface 604 of the seatback frame 108. The movement of the support strip 120 (e.g., when moving from the back position 704 to the forward position 708) may be approximately or substantially one centimeter, may be approximately or substantially two centimeters, may be approximately or substantially 2.5 centimeters, may be approximately or substantially three centimeters, may be approximately or substantially four centimeters, or may be approximately or substantially five or more centimeters. For example, the movement of the support strip 120 when moving from the back position 704 to the forward position 708 may be approximately or substantially 2.55 centimeters (e.g., on inch).

Figure 8:
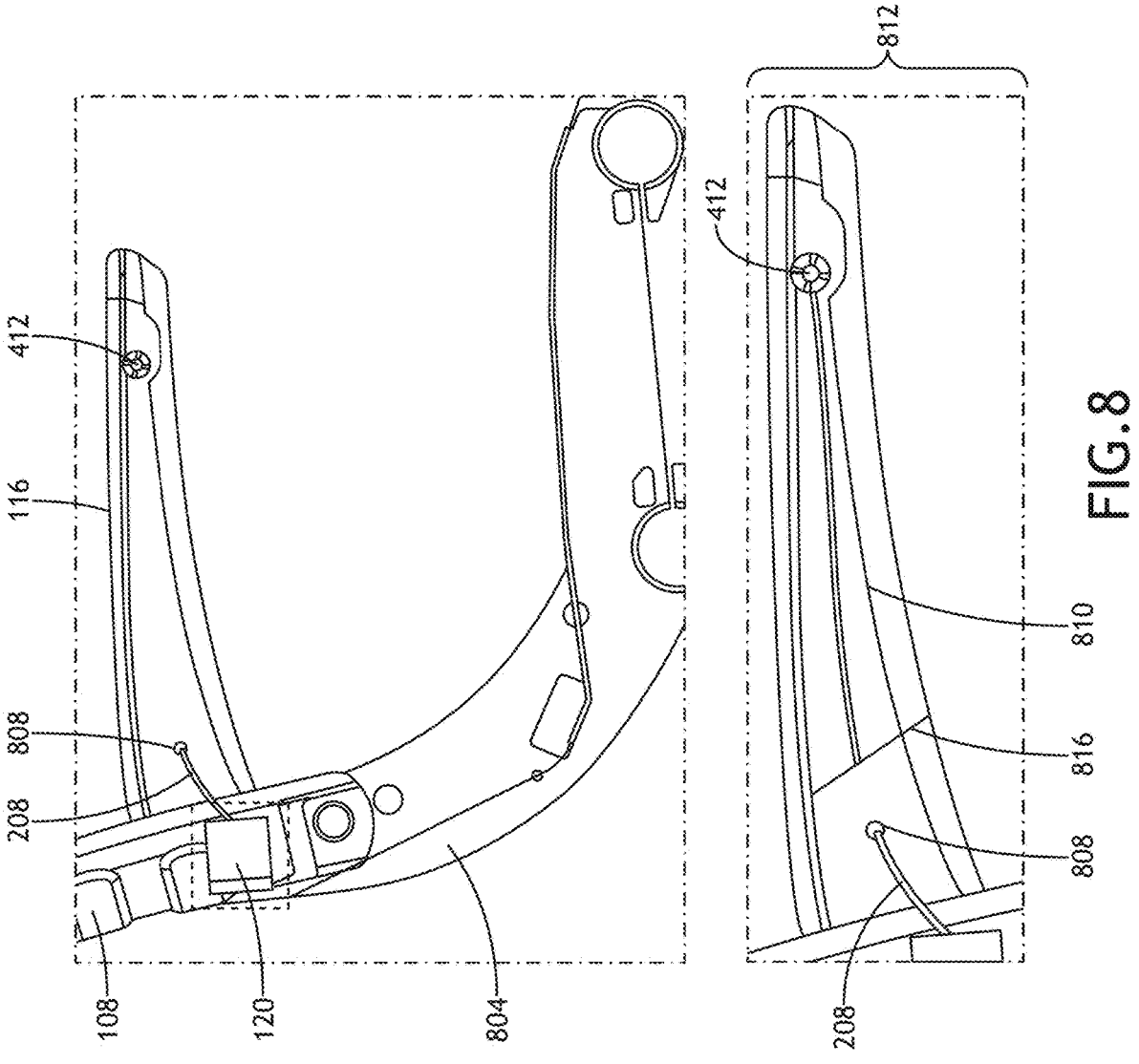
FIG. 8 illustrates a side view of portions of a seatback frame, a spreader, armrests, and the back support mechanism.
Figure 9:
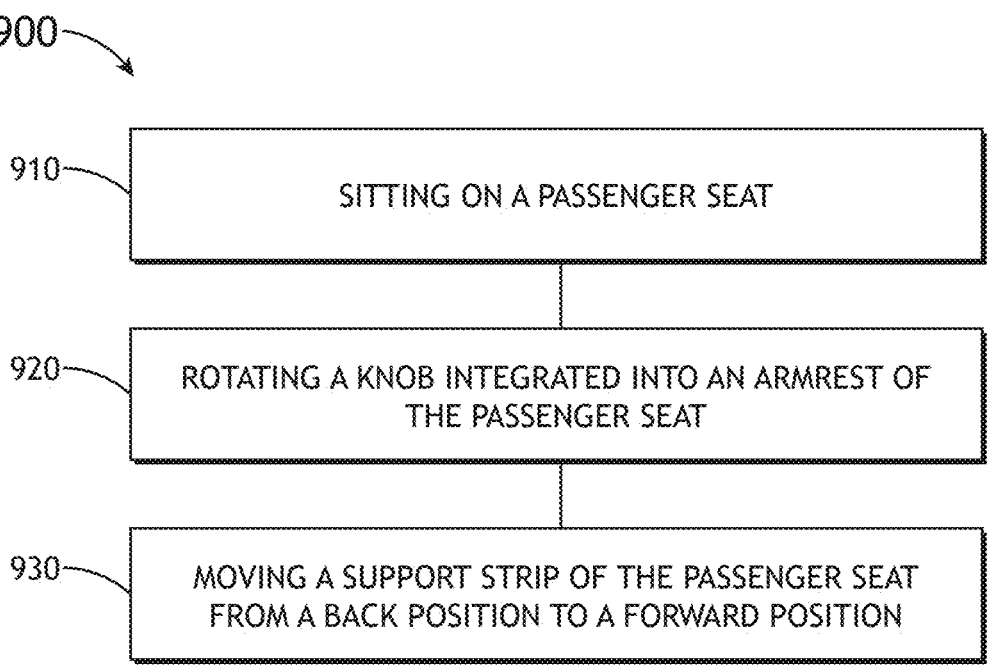
FIG. 9 is a flow chart illustrating a method for using a passenger seat equipped with a back support mechanism.

A side view of an armrest 116 (adjacent to the seatback frame 108 and linked to a spreader 804) is illustrated in FIG. 8. The position support strip 120 is shown for clarity. In embodiments, the first cable 208 is integrated into the armrest 116 via one or more apertures 808 that lead the first cable to a cavity 810 inside the armrest 116, as shown in inset 812. The first cable 208 then connects to the knob 412.

In embodiments, the system 100 includes the support strip 120, the first cable 208, and the first cable adjustor 324 (e.g., such as the knob). In embodiments, the system 100 may further include the second cable 212, the second cable 212 and the second cable adjustor 332. In embodiments, the system 100 may further include the seatback frame 108 and the armrest 116. In embodiments, the system may further include the passenger seat 104.

A method 900 for utilizing the system 100 is also disclosed. The method may be utilized by a passenger adjusting the system 100 in order to sit more comfortably in the passenger seat. In embodiments, the method 900 includes a step 910 of sitting in the passenger seat 104 (e.g., a passenger seat 104 that includes the system 100). In embodiments, the method 900 includes a step 920 of rotating the knob 412 integrated into the armrest 116 of the passenger seat 104. For example, the passenger may rotate one knob 412, or both knobs 412 (e.g., one on each armrest 116a-b). In embodiments, the method includes a step 930 of moving the support strip 120 from a back position 704 to the forward position 708.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system for a passenger seat, comprising:
   a support strip configured to be disposed adjacent to a lower position of a seatback frame of the passenger seat;
   a first cable coupled on a first end to a first strip end of the support strip, wherein the first cable comprises a Bowden cable, the Bowden cable comprising:
     an inner cable coupled to the first cable adjustor and the first end of the support strip; and
     an outer cable; and
   a first cable adjustor comprising a first knob and coupled to a second end of the first cable via the first knob, wherein the first knob comprises an axle coupled to the inner cable, wherein a rotation of the first knob causes the inner cable to wind onto the axle and causes a movement of the support strip from a back position to a forward position.

2. The system of claim 1, wherein the first cable adjustor is integrated into a first armrest of the passenger seat.

3. The system of claim 2, further including a first armrest and the seatback frame.

4. The system of claim 3, wherein the first cable adjustor is integrated into the first armrest of the passenger seat.

5. The system of claim 2, further including the passenger seat.

6. The system of claim 1, wherein the first cable adjustor comprises at least one of a lever or pull handle.

7. The system of claim 1, further comprising:
   a second cable comprising a first end, the first end of the second cable coupled to a second end of the support strip; and
   a second cable adjustor coupled to a second end of the second cable, wherein an actuation of the second cable causes a movement of the support strip from a back position to a forward position.

8. The system of claim 7, wherein the first cable comprises,
   wherein the second cable comprises a second Bowden cable, the second Bowden cable comprising:

an inner cable coupled to the second cable adjustor and the second end of the support strip; and an outer cable.

9. A passenger seat comprising:

a seat pan;

a seat back frame;

a first armrest;

a support strip disposed adjacent to a lower position of a seatback frame of the passenger seat;

a first cable coupled on a first end to the support strip, wherein the first cable comprises a Bowden cable, the Bowden cable comprising:

an inner cable coupled to the first cable adjustor and the first end of the support strip; and an outer cable; and a first cable adjustor comprising a first knob with axle and integrated into the first armrest, wherein the first knob is coupled to a second end of the first cable, wherein a rotation of the first knob causes the inner cable to wind onto the axle and causes a movement of the support strip from a back position to a forward position.

10. The passenger seat of claim 9, further comprising:

a second cable comprising a first end, the first end of the second cable coupled on a first end to a second end of the support strip; and a second cable adjustor coupled to a second end of the second cable, wherein an actuation of the second cable causes a movement of the support strip from a back position to a forward position.

11. The passenger seat of claim 10, wherein the first cable comprises, wherein the second cable comprises a second Bowden cable, the second Bowden cable comprising:

an inner cable coupled to the second cable adjustor and the second end of the support strip; and an outer cable.

12. The passenger seat of claim 11, wherein the second cable adjustor comprises a second knob, wherein the second knob comprises an axle coupled to the inner cable, wherein the rotation of the second knob causes the inner cable to wind onto the axle and causes a movement of the support strip from a back position to a forward position.

13. A method comprising:

sitting in a passenger seat wherein the passenger seat comprises:

a support strip disposed adjacent to a lower position of a seatback frame of the passenger seat;

a first cable coupled on a first end to a first strip end of the support strip, wherein the first cable comprises a Bowden cable, the Bowden cable comprising:

an inner cable coupled to the first cable adjustor and the first end of the support strip; and an outer cable; and a first cable adjustor comprising a first knob and coupled to a second end of the first cable via the first knob, wherein the first knob comprises an axle coupled to the inner cable, wherein a rotation of the first knob causes the inner cable to wind onto the axle and causes a movement of the support strip from a back position to a forward position;

rotating the knob; and moving the support strip of the passenger seat from a back position to a forward position.

* * * * *